United States Patent [19]
Hideaki et al.

[11] Patent Number: 5,992,397
[45] Date of Patent: Nov. 30, 1999

[54] COMBUSTION ENHANCING APPARATUS AND METHOD

[76] Inventors: Watase Hideaki, Blk 135 Serangoon Ave 3, #07-03, Chiltern Park, Singapore, 556114; Dalupan Romulo Vallejos, Sunset View Condominium, 2230 Roxas Boulevard, Pasay City, Philippines, 1300; Tan Slew Lay, Blk 131 # 05-1335, Bedok Reservoir Road, Singapore, 470131

[21] Appl. No.: 08/885,407

[22] Filed: Jun. 30, 1997

[51] Int. Cl.$^6$ .................................................. F02M 27/04
[52] U.S. Cl. ..................... 123/538; 123/573; 123/25 A
[58] Field of Search .................................. 123/572, 573, 123/536, 537, 538, 1 A, 25 A

[56] References Cited

U.S. PATENT DOCUMENTS

| | | | |
|---|---|---|---|
| 3,989,017 | 11/1976 | Reece | 123/536 |
| 4,308,847 | 1/1982 | Ruizzo | 123/536 |
| 5,243,950 | 9/1993 | Dalupan | 123/536 |
| 5,271,370 | 12/1993 | Shimada et al. | 123/25 A |
| 5,694,888 | 12/1997 | De Lima | 123/1 A |

*Primary Examiner*—Marguerite McMahon
*Attorney, Agent, or Firm*—Cesari and McKenna, LLP

[57] ABSTRACT

A gas apparatus for internal combustion engine is disclosed in which recovered hydrocarbon gas vapors from the fuel tank and the hydrocarbon with radical hydrocarbon gas vapors from the crankcase, are mixed together with air and alcohol with water solution in an impeller mixing chamber causing modified hydrocarbon gas vapors and oxygen gas vapors to pass through an electronic ionizer producing negatively charged pre-oxidized hydrocarbon gas vapors, then fed through the air induction system to improve mass of air to mass of fuel ratio in an internal combustion engine. A method for production of negatively charged pre-oxidized hydrocarbon gas vapors is also disclosed.

33 Claims, 3 Drawing Sheets

COMBUSTION ENHANCING APPARATUS AND METHOD

FIELD OF THE INVENTION

The present invention relates generally to improving engine efficiency particularly the mass of air to mass of fuel ratio, combustion thermal efficiency and reduction of carbon deposit accumulation in the combustion systems of diesel, petrol and propane internal combustion engines.

This invention make use of recovered hydrocarbon gas vapors vented from the fuel tank and blow-by hydrocarbon with hydrogen gas vapors vented from the positive crankcase ventilation system of an engine.

These vented hydrocarbon gas vapors are mixed with air and passed into a liquid mixture in the apparatus, disassociating the molecular chain of hydrocarbon gas vapors into methane and ethane gas vapors with oxygen, which bubble out and then pass through a negative ionization process.

These newly produced gas vapors from the apparatus called negatively charged pre-oxidized hydrocarbon gas vapors are then fed through the air induction system of an internal combustion engine to improve mass of air to mass of fuel ratio.

BACKGROUND OF THE INVENTION

The internal combustion engine is used to convert the chemical energy of fuel into heat energy and then to convert this heat energy into usable mechanical energy. This is achieved by combining the appropriate amounts of air and fuel and burning the mixture in an enclosed cylinder at a controlled rate.

An average air/fuel ratio of good combustion for a petrol engine is about 15 parts of air to 1 part of fuel by weight. Diesel engines operate on a much wider air/fuel ratio, since air intake is not regulated on most diesel engines. The ratio may range from about 20:1 to about 100:1. This fact, plus the high compression of the diesel engine, makes it a fuel efficient engine.

But the amount of oxygen may become insufficient due to different kinds of fuel grades and the quality of oxygen entering into the engine. These are some factors that affect energy loss in an internal combustion engine.

The efficiency of a typical existing internal combustion engine illustrated in FIG. 1, in converting the potential energy in fuel to mechanical energy is only about 33%. Of the available fuel energy in an engine, about one-third is loss, due to the following factors.

The main factor is pyrolysis, which is caused by the mixing of undesirable gas compounds with hydrocarbons gas vapors vented out from the positive crankcase vent and the fuel tank vent connected to the air induction system 13, of an engine. The mixing of undesirable gas compounds upsets the quality of oxygen present during the combustion process.

The other factor is the loss hydrocarbon gas vapors vented to the atmosphere from the fuel tank 12, and the positive crankcase vent 14. These factors contribute to the loss of energy and the imbalance of the air to fuel ratio. The remaining one-third energy loss of hydrocarbons gas vapors is due to the emission of unburnt hydrocarbons through the exhaust system 16. These factors result in poor combustion.

Accordingly, it is desirable to provide an apparatus to produce negatively charged pre-oxidized hydrocarbon gas vapors to combine with the air and fuel mixture in the combustion chamber of an engine to improve the mass of air to mass of fuel ratio to enhance combustion in an internal combustion engine. In addition, the ambient air ($N+O_2$) with the negatively charged pre-oxidized hydrocarbon gas vapors ($HC+O_{-2}$) mix with the vaporized fuel in the combustion chambers contains more oxygen, creating greater expansion of the pistons during the combustion process. After combustion, the exhaust emission contains lower counts of hydrocarbons (<HC), lower carbon monoxide (<CO), lower oxides of nitrogen (<$NO_2$), lower carbon particulates (<CP) with compound gas elements composed of carbon dioxide ($CO_2$), nitrogen dioxide ($NO_2$), sulfur dioxide ($SO_2$) and extra oxygen ($O_2$).

Here is the equation that shows what happens after combustion in an engine.

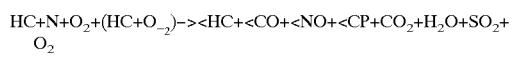

$$HC+N+O_2+(HC+O_{-2})\text{->}<HC+<CO+<NO+<CP+CO_2+H_2O+SO_2+O_2$$

The first objective of this invention is to provide an apparatus to recover normally lost hydrocarbon gas vapor vented out into the atmosphere.

The second objective is to pass the recovered hydrocarbon gas vapors through a liquid mixture in the apparatus to form ethane and methane gases associated with oxygen.

The third objective is to disassociate hydrocarbon gas vapors in the liquid mixture through the use of an impeller, resulting in a venting from the liquid solution of the high octane vapors.

The fourth objective is to increase the oxygen ratio by adding negatively charged pre-oxidized hydrocarbon to the air flowing through the induction system of the engine. The fifth objective is to provide negatively charged pre-oxidized hydrocarbon gas vapors, produce high expansion of pistons, increase the engine power, save fuel consumption, reduce the emission of hydrocarbon gas vapors and achieve higher efficiency of engine performance.

The sixth objective is to improve the thermal efficiency of an engine by adding negatively charged oxygen into the combustion chamber of an engine, causing a lower amount of oxides of nitrogen.

These and other objects of the invention will become apparent in light of the accompanying specification, claims, and drawings.

SUMMARY OF THE INVENTION

According to the invention, there is provided an apparatus producing negatively charged pre-oxidized hydrocarbon gas vapors comprising:

two gas inlets, a first connected to a fuel tank vent, a second connected to a engine crankcase vent;

one air inlet and one air outlet to the air induction system; means for mixing hydrocarbon as vapors from the first and second gas inlets with a mixture of distilled or filtered water, alcohol and turpentine solution to form a gaseous mixture;

one or more ionizer circuits each having two sets of output paralleled electrode pins with a negative direct current output power ranging from −6000 VDC to −15000 VDC or higher for negatively charging the gaseous mixture.

Preferably the solution comprises ethanol with a concentration in the range 5% to 30% and a turpentine concentration of about 5% mixed with distilled or filtered water.

Preferably the mixing means comprises an impeller mixing chamber or several chambers to which the inlets are connected and includes means for mixing the vented gases of hydrocarbon, radical hydrogen and air with the liquid mixture and means for bubbling the vented gases through the liquid mixture. The apparatus further includes a divided charcoal canister, one half portion of which is connected to the fuel tank for absorbing vented hydrocarbon gas vapors and ambient air, drawn by vacuum effect by the air induction system and the other half portion of which provides air pressure release from the apparatus.

There is also an oil separator filter for trapping oil residue which allows the oil to return back to the engine crankcase source and allows only the passages of hydrocarbon gas vapors and radical hydrogen gases from the outlet from the engine crankcase vent.

BRIEF DESCRIPTION OF THE DRAWINGS

An embodiment of the invention will now be described by way of example, with reference to the accompanying drawings, in which.

DETAILED DESCRIPTION OF THE PREFERRED EMBODIMENT

Figure 1:
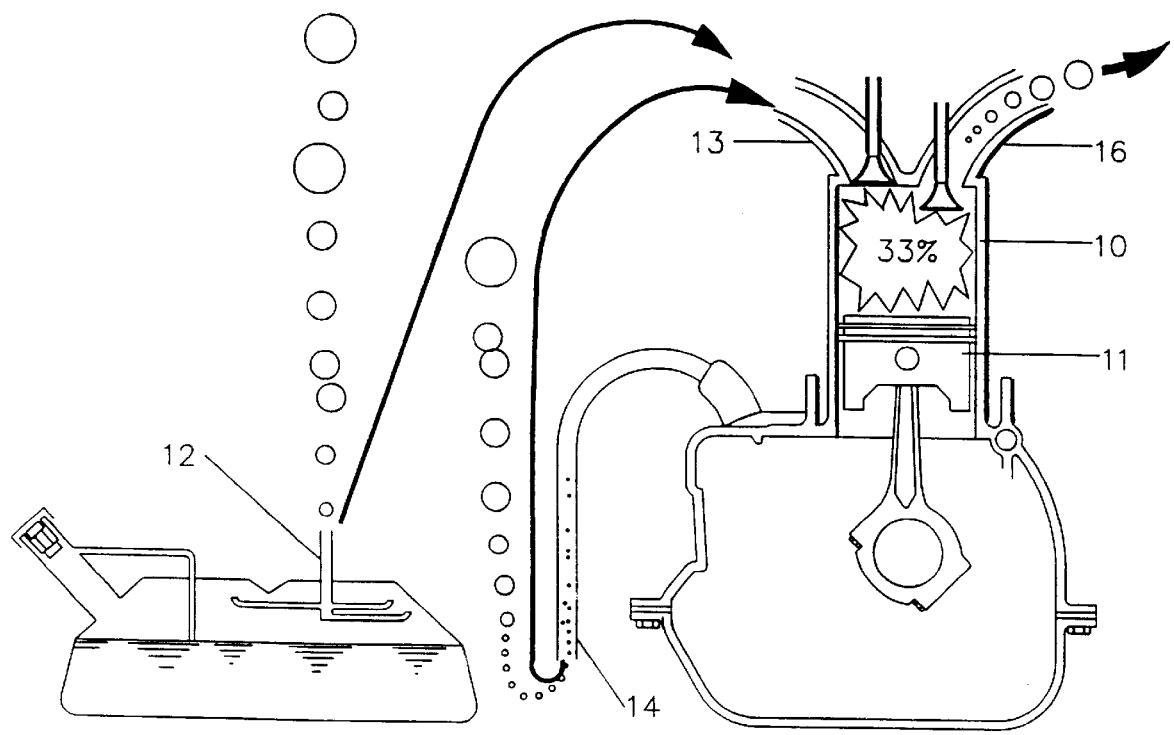
FIG. 1, already described, is an illustration of energy loss in a typical internal combustion engine.
Figure 2:
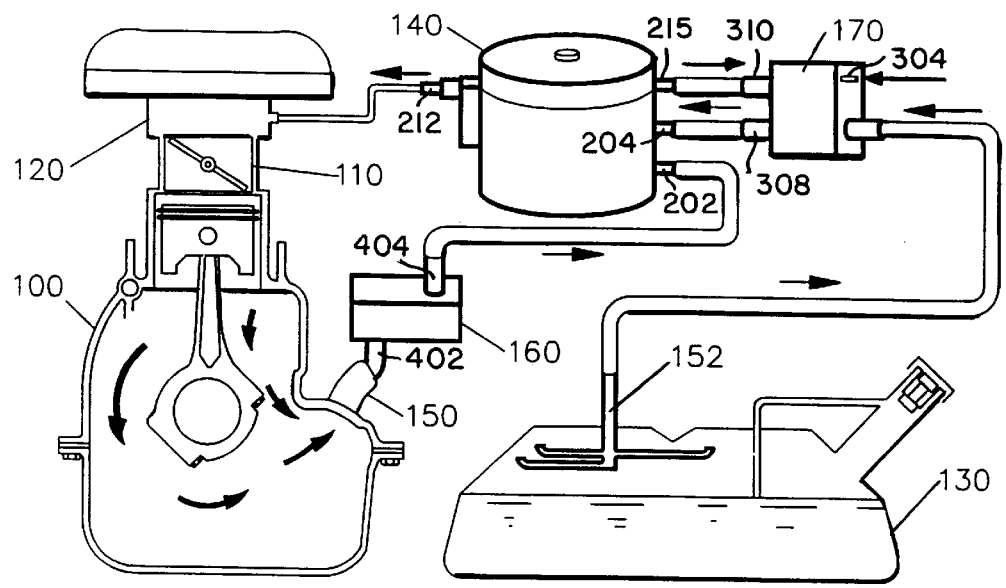
FIG. 2 is a schematic diagram of an engine incorporating apparatus according to the invention.

An embodiment of the invention is schematically shown in FIG. 2 in which an internal combustion engine 100 is provided with a carburetor 110 for combining air from an air intake 120 and fuel from a fuel tank 130 and providing the mixture to the cylinders of the engine 100 for combustion. Blow-by gases from the engine crankcase are vented under positive crankcase pressure through engine crankcase opening 150 and fuel vapor gases are vented from fuel tank 130 through opening 152. The blow-by gases are fed via an oil separator filter 160 and the fuel tank gases are fed via a charcoal canister 170 to the combustion enhancing apparatus 140, that being an embodiment of the invention.

Figure 3:
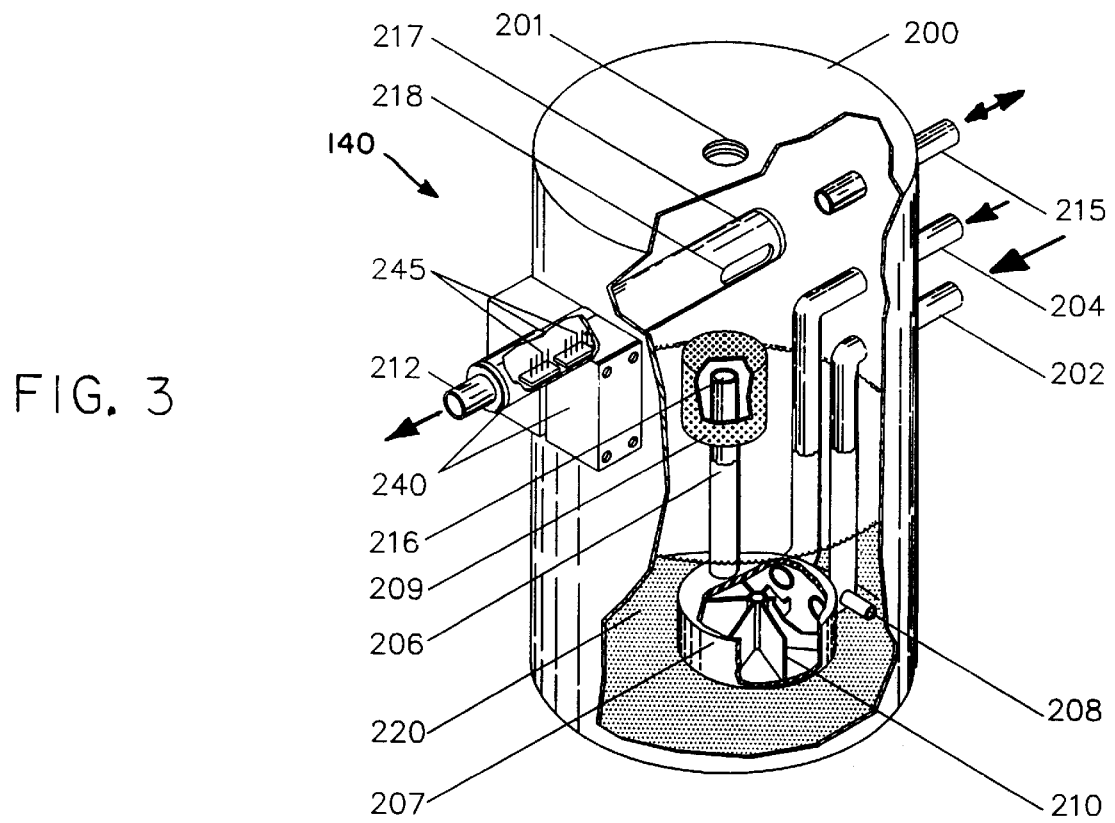
FIG. 3 is a part sectional perspective view of the apparatus of FIG. 2.

FIG. 3 shows the apparatus 140 in more detail.

The apparatus 140 illustrated in FIGS. 2 and 3 comprises a casing 200 having an opening 201 for liquid solution fill up and a first inlet 202 connected to the oil separator filter 160 (FIG. 2). The cannister also has a second inlet 204 from charcoal canister 170, and a third inlet and outlet combination 215 from the charcoal canister 170. Also present in casing 200 is an outlet 212 connected to the air induction system 110 of the engine. As best seen in FIG. 3, the inlets 202 and 204 feed into a mixing chamber 207, containing a mechanical driven impeller 210. The inlet 202, supplies the radical hydrogen and hydrocarbon gases from the positive crankcase ventilation system outlet 150, through the oil separator filter 160. The inlet 204 is a connection for introducing the hydrocarbon gases and air mixture from fuel tank 130 via cannister 170 for mixing within the mixing chamber 207. A liquid solution 220 in casing 200 is drawn into the impeller chamber inlet 208. As shown in FIG. 2, the inlet 204 through which the hydrocarbon gases and air mixture are introduced is connected through cannister 170 to the fuel evaporation outlet 152 of fuel tank 130. The inlet/outlet 215 of casing 200 draws in the ambient air gas mixture and allows high pressure release of air from the apparatus 140 through the charcoal cannister 170. An impeller mixing chamber outlet tube 206 is placed in a vertical position for disposing the liquid solution 220 through an opening 216 at the upper end of that tube. The liquid solution overflows through a filter 209 and is recycled back to the inlet 208. At the same time, gas mixtures present in casing 200 are introduced through an opening 218 into a tubular channel 217, which acts to guide the flow of those gases to the casing outlet 212. Within the tubular channel 217 are two sets of parallel electrode pins 245. Two ionizer circuits 240 are mounted to casing 200 adjacent pins 245. These use the process of negative ionization to ionize or influence negative electrons to the gas mixtures. The final product of the apparatus 100 is negatively charged pre-oxidized hydrocarbon gas vapors which are then fed to the carburetor 110 (FIG. 2). These gas vapors improve the mass of air to mass of fuel ratio. The results are improved fuel consumption and at the same time increased engine power of an internal combustion engine.

Figure 4:
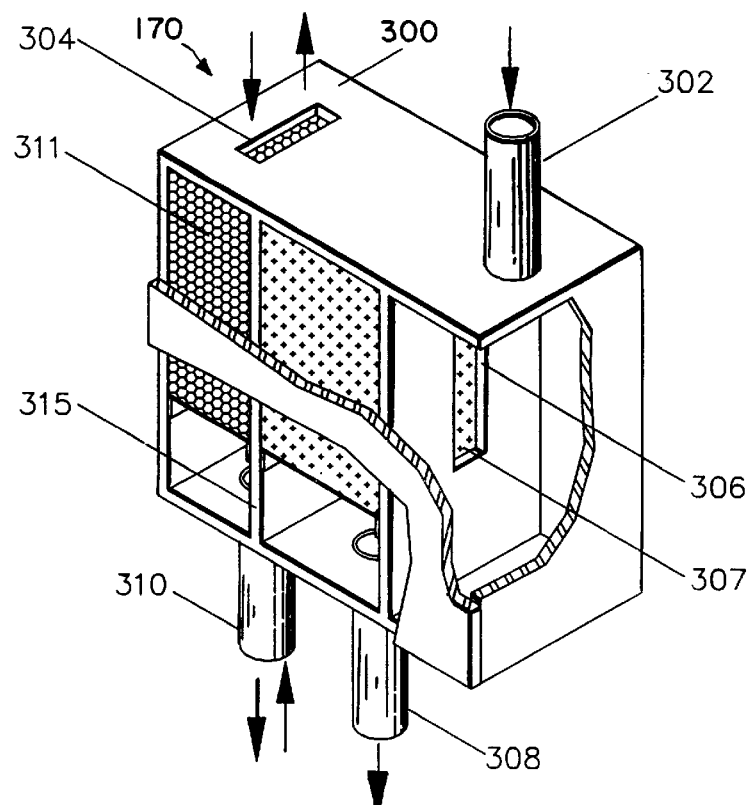
FIG. 4 is a sectional perspective view of the charcoal canister of the FIG. 2 apparatus.

The carbon canister 170 is illustrated in FIGS. 2 and 4 and comprises a housing 300 having an inlet pipe 302 connected to fuel tank outlet 152 and output pipe 308 connected to inlet 204 of apparatus 140. The pipe 302 connects to an inlet channel 306 in housing 300 adjacent an absorbing element 307 comprised of pressed charcoal which on the downstream side is provided with an outlet channel 308 leading to pipe 204 of the apparatus 200. An air inlet 304 is provided at the opposed end of the channel 310. Volatile hydrocarbon gas vapors which vent from the fuel tank through outlet 52 are fed through to the inlet 302. These hydrocarbon gas vapors are absorbed and lightly held by the charcoal element in cannister 170. When the engine starts, the hydrocarbon gas vapors are drawn through channel 308 and air flows through inlet 304. Since the hydrocarbon gases are lightly held in the charcoal element 307, they are drawn out by the vacuum pressure to an inlet 204 of apparatus 140. Housing 300 also contains a separate coarse charcoal absorbing or filter element 311 separated from element 307 by a plate 315. The coarse charcoal filter 311, is an air filter and hydrocarbon trapping element as well as a high pressure air release path 304 for gases from the apparatus 100.

Figure 5:
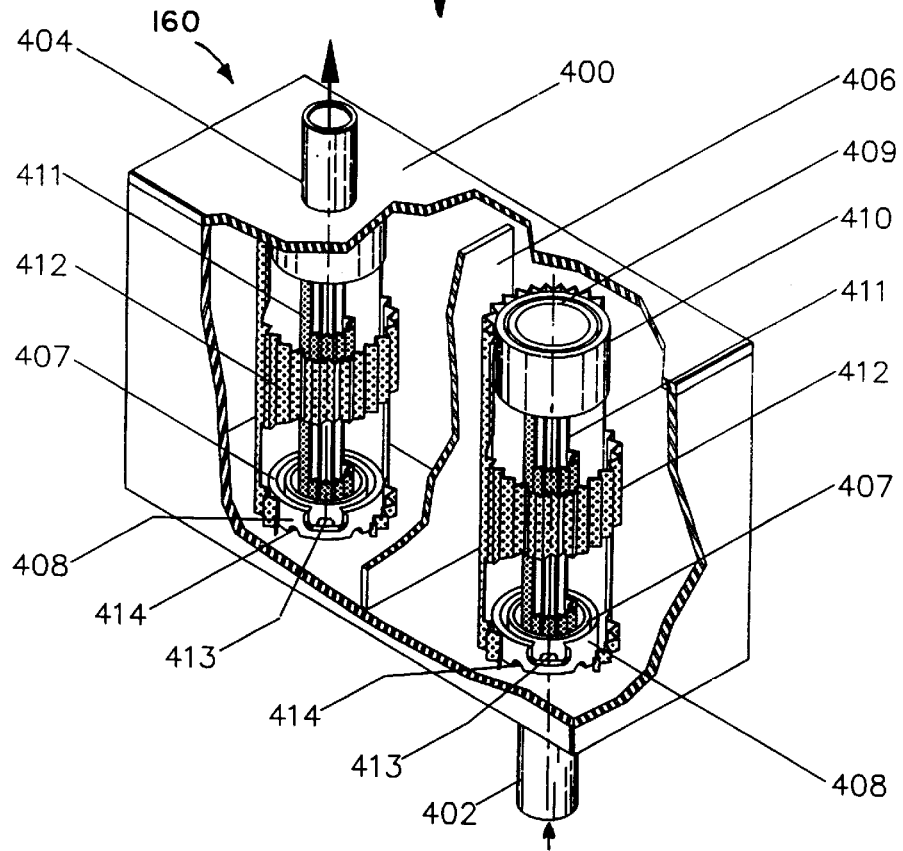
FIG. 5 is a sectional view of an oil separator filter present in the FIG. 2 apparatus.

The oil separator filter 160 is shown in FIG. 5. The oil separator filter comprises a housing 400, having a vapor inlet 402 and vapor outlet 404. A single plate deflector 406, divides the filter into two filter sets allowing gas to pass around the sides and over the top of the plate. Both filter sets have a lower primary circular shape filter holder 407 and a lower secondary filter holder 408 and adjacent upper primary and secondary filter holders 409 and 410, respectively. The tubular shape primary filter 411 and secondary filter 412 on both sets absorb oil residue as oil proceeds towards the lower primary holder 413 and lower secondary holder 414 each of which has at least four oil passages. Most of the oil residues are drawn back to the engine 100 (FIG. 2) through pipe 402. Preferably 3M type P or oil fill paper material is used for these filters.

The vented gas vapor mixtures of blow-by hydrocarbons and radical hydrogen gases, fuel tank hydrocarbon gases and alcohol gas vapor passed into the engine from the apparatus 140 is to some extent disassociated by the negative ionization process discussed above thus forming negatively charged pre-oxidized hydrocarbons. These comprise negatively charged ionized oxygen, methane and ethane vapors which react with the air and fuel entering the engine combustion chambers resulting in a more efficient use of these blow-by and fuel tank gas vapors which otherwise would be vented out into the atmosphere.

During tests, it was observed that continuing use of the apparatus 140 appears to remove carbon deposits from the engine thus providing a carbon cleaning effect, due to the excess of negatively charged oxygen, whereby accumulated carbon deposits are ignited throughout the combustion system, eventually cleaning the combustion chamber surfaces. From the positive crankcase ventilation, the oil separator filter 160, further traps oil residues and allows the flow of radical hydrogen and hydrocarbon gas vapors into the apparatus 140, thus preventing oil residues from entering into the apparatus 140. Oil consumption is also reduced since the residual oil returns back into the engine.

The embodiment of the invention described is not to be construed as limitative. For example, although shown used with a carburetor intake system, the invention is equally of use with fuel injected gas engines and other kinds of internal combustion engines such as diesel and propane engines. Although a solution of ethanol or methanol is used in the apparatus 140, other alcohols may be used. Furthermore, although inlets from the engine crankcase and the fuel tank vent outlet 150, 152 have been shown, the apparatus of the invention may be used with only one inlet from one or the other vent outlet. The embodiment of FIG. 3 has been shown with two electronic ionizers 240. This is not to be construed as limitative, and any number of electronic ionizers may be employed, depending upon the vented gas mixture flow rate. The mixing means in apparatus 140 mixes the gases with the alcohol solution 220 in the embodiment of FIG. 3 by mixing the liquid mixture into contact with the gases and air by bubbling the gases through the solution. However, other mixing methods may be used. For example, an ultrasonic spraying device may be used instead of the impeller 210 and a pulsating pump vibration mixing device may be used with the embodiment of FIG. 3 to assist mixing of the gases with the solution. Tests were conducted to evaluate the effects of a test apparatus in accordance with the invention described upon a diesel vehicle's performance in terms of smoke level, fuel consumption and power measurement.

For this purpose, comparative tests were conducted whereby measurement of smoke level, fuel consumption and power measurement were carried out before and after installation of the apparatus in a Mitsubishi Canter 1992 lorry pickup having a two liter fuel injected diesel engine and a Mitsubishi tour bus having an engine capacity of 3298 cc.

MEASUREMENT PROCEDURE (MITSUBISHI CANTER 1992 LORRY PICKUP)

1. Smoke Level

The smoke levels were measured using a Hartridge Smoker.

2. Fuel Consumption Measurement a. At a constant speed,

This test was carried out while the test vehicle was being driven on a chassis dynamometer simulating on-the-road driving conditions. The amount of fuel consumed in 10 minutes was measured while the vehicle was being driven at the constant speed of 90 kn/h.

b. At medium and maximum loads.

This test was carried out while the test vehicle was being driven on a chassis dynamometer simulating on-the-road driving conditions. The loads were applied to the test vehicle which for medium load was 0.67 kN and for maximum load was 1.33 kN. The amount of fuel consumed in 1 minute was measured while the vehicle was being driven at the both loads (medium and maximum) at the speed of 20 km/h.

c. Power measurement

The maximum power of the test vehicle was measured using a chassis dynamometer.

EQUIPMENT

1. Hartridge Smokemeter MK III.
2. PLU 401/108 Fuel Metering System.
3. MAHA Chassis Dynamometer.

TEST PROCEDURE

1. Carry out measurements tests on smoke level, fuel consumption and power measurement.
2. Install the device in the test vehicle as described above.
3. Run for 200 km.
4. Repeat Step 1.

TEST RESULTS

1. At the Constant Speed 90 km

| Text | Sampling | Fuel | WITHOUT DEVICE | | Fuel | WITH DEVICE | |
|---|---|---|---|---|---|---|---|
| Speed (km/h) | Time (min) | Consumed (liter) | Average (l/h) | Average (l/h) | Consumed (liter) | Average (l/h) | Average (l/h) |
| 90 | 10 | 1.3548 | 8.12 | 8.0730 | 1.3170 | 7.90 | 7.903 |
| | | 1.3348 | 8.01 | | 1.3168 | 7.90 | |
| | | 1.3486 | 8.09 | | 1.3185 | 7.91 | |

2. At Medium Load 0.67 kN

| Text | Sampling | Fuel | WITHOUT DEVICE | | Fuel | WITH DEVICE | |
|---|---|---|---|---|---|---|---|
| Speed (km/h) | Time (min) | Consumed (liter) | Average (l/h) | Average (l/h) | Consumed (liter) | Average (l/h) | Average (l/h) |
| 20 | 1 | 0.0740 | 4.40 | 4.342 | 0.0701 | 4.18 | |
| | | 0.0725 | 4.31 | | 0.0690 | 4.10 | |
| | | 0.0715 | 4.27 | | 0.0677 | 4.04 | 4.126 |
| | | 0.0729 | 4.35 | | 0.0694 | 4.14 | |
| | | 0.0734 | 4.38 | | 0.0698 | 4.17 | |

3. At Maxmium Load 1.33 kN

| | | WITHOUT DEVICE | | | | WITH DEVICE | |
|---|---|---|---|---|---|---|---|
| Text Speed (km/h) | Sampling Time (min) | Fuel Consumed (liter) | Average (l/h) | Average (l/h) | Fuel Consumed (liter) | Average (l/h) | Average (l/h) |
| 20 | 1 | 0.0938 | 5.59 | 5.566 | 0.0870 | 5.18 | 5.200 |
| | | 0.0933 | 5.56 | | 0.0862 | 5.14 | |
| | | 0.0931 | 5.55 | | 0.0872 | 5.20 | |
| | | 0.0937 | 5.59 | | 0.0879 | 5.24 | |
| | | 0.0735 | 5.54 | | 0.0877 | 5.24 | |

SUMMARY OF TEST RESULTS

4. Fuel consumption test at the constant speed

| TEST SPEED | WITHOUT DEVICE | WITH DEVICE | PERCENTAGE DIFFERENCE |
|---|---|---|---|
| 90 km/h | 8.97 L/100 km | 8.78 L/100 km | −2.12% |

5. Fuel consumption test at the medium load 0.67 kN.

| TEST SPEED | WITHOUT DEVICE | WITH DEVICE | PERCENTAGE DIFFERENCE |
|---|---|---|---|
| 20 km/h | 21.71 L/100 km | 20.63 L/100 km | −4.97% |

6. Fuel consumption test at the maximum load 1.33 kN

| TEST SPEED | WITHOUT DEVICE | WITH DEVICE | PERCENTAGE DIFFERENCE |
|---|---|---|---|
| 20 km/h | 27.83 L/100 km | 26.00 L/100 km | −6.58% |

7 Smoke Level Test

| TEST SPEED | WITHOUT DEVICE | WITH DEVICE | PERCENTAGE DIFFERENCE |
|---|---|---|---|
| SMOKE LEVEL (HS | 84 | 37 | −55.95% |

8 Maximum Power Test

| TEST SPEED | WITHOUT DEVICE | WITH DEVICE | PERCENTAGE DIFFERENCE |
|---|---|---|---|
| MAXIMUM POWER ( | 39 | 42 | +7.69% |

SUMMARY

1. Fuel consumption at the constant speed 90 km/h reduced by 2.12%.
2. Fuel consumption at the medium load 0.67 kN and the speed 20 km/h reduced by 4.97%.
3. Fuel consumption at the maximum load 1.33 kN and the speed 20 km/h reduced by 6.58%.
4. Smoke level reduced by 55.95%
5. Maximum power increased by 7.69%.

METHOD OF TEST (MITSUBISHI TOUR BUS)

A comparative study on the performance of the vehicle in terms of exhaust emission was conducted before and after the installation of the device. The emission test was carried out at the exhaust pipe and the Positive Crankcase Ventilation (PCV) while the engine was running at idle speed and at 2000 rpm:

a. Before installation of device.
b. After installation of device and a 590 km drive.

Ignition timing of the engine was adjusted by 3–5 degree (⅛ turn) advanced after the installation of the Enemax. This adjustment was said to be essential and was part of the application procedure for the device.

The gases emitted from the vehicle exhaust were sampled and analyzed for the following:

1. Carbon dioxide, Carbon monoxide and Hydrocarbons
   Horiba automotive emission analyzer
2. Nitrogen oxide as $NO_2$
   United States Environmental Protection Agency Method 7.

TEST RESULTS

1) At idle speed

| Test Item | WITHOUT DEVICE | | WITH DEVICE | Effect of Device |
|---|---|---|---|---|
| Sampling point | PCV | Exhaust | Exhaust | on gas emission |
| Carbon dioxide (CO$_2$), % v/v | 0.14 | 3.00 | 2.06 | Reduced by 34.4% |
| Carbon monoxide (CO), % v/v | <0.01 | 0.02 | 0.03 | No significant effect |
| Hydrocarbons (HCs), ppm | 63.2 | 24.3 | 20.8 | Reduced by 76.2% |
| Nitrogen oxide as NO$_2$, ppm | — | 84 | 46 | Reduced by 45.2% |

2) At high speed (about 2000 rpm)

| Test Item | WITHOUT DEVICE | | WITH DEVICE | Effect of Device |
|---|---|---|---|---|
| Sampling point | PCV | Exhaust | Exhaust | on gas emission |
| Carbon dioxide (CO$_2$), % v/v | 0.23 | 3.70 | 2.46 | Reduced by 37.4% |
| Carbon monoxide (CO), % v/v | <0.01 | 0.04 | 0.04 | No significant effect |
| Hydrocarbons (HCs), ppm | 60.3 | 26.3 | 17.2 | Reduced by 80.1% |
| Nitrogen oxide as NO$_2$, ppm | — | 116 | 46 | Reduced by 60.3% |

3) Smoke capacity test

| Test Item | WITHOUT DEVICE | WITH DEVICE | Effect of Device on gas emission |
|---|---|---|---|
| Smoke capacity, HSU | 90 | 34 | Reduced by 62.2% |

We claim:

1. Combustion enhancement apparatus for an internal combustion engine, said apparatus comprising:
   a casing;
   a first gas inlet to the casing for connection to a fuel tank for receiving hydrocarbon gases from said tank,
   a second gas inlet to the casing for connection to an engine crankcase to take hydrocarbon gases from said crankcase,
   a third gas inlet to the casing for air,
   mixing means in the casing for mixing hydrocarbon gas vapors from the first gas inlet, hydrocarbon gas vapors from the second gas inlet and air from the third gas inlet with liquid to produce a fluid mixture,
   conducting means in the casing to conduct said fluid mixture from the mixing means,
   one or more ionizers connected to receive the mixture from the mixing means and to ionize said fluid mixture to form negatively charged pre-oxidized hydrocarbon gas vapors, and
   an outlet from the casing for conducting said vapors from said conducting means to the air induction system of an internal combustion engine.

2. The apparatus as claimed in claim 1 wherein the mixing means comprise means for spraying the hydrocarbon gases into contact with said liquid.

3. The apparatus as claimed in claim 1 wherein the mixing means comprises a mixing chamber in said casing in which the hydrocarbon gases from the crankcase and fuel tank and air are bubbled through said liquid to said outlet.

4. The apparatus as claimed in claim 3 wherein the mixing means include an ultrasonic spraying device in said mixing chamber.

5. The apparatus as claimed in claim 2 wherein the mixing means include a motor driven impeller in said mixing chamber.

6. The apparatus as claimed in claim 3 wherein the mixing means include a pump for pumping said liquid through the mixing chamber.

7. The apparatus as claimed in any one of claims 1 to 6 wherein said liquid has an alcohol concentration in the range 5%–30%, the balance being filtered or distilled water.

8. The apparatus as claimed in any one of claims 1 to 6 wherein said liquid has a terpentine concentration of 2% to 15%, the balance being filtered or distilled water.

9. The apparatus as claimed in any one of claims 1 to 6 and further comprising a charcoal canister connected to said first inlet said cannister containing two separate charcoal elements which absorb hydrocarbon gas vapors.

10. The apparatus as claimed in claim 9 wherein the fuel tank has a vent and said first inlet is connected to said tank vent.

11. The apparatus as claimed in claim 9 wherein one of said charcoal elements is a coarse charcoal element for air pressure release and air filtration.

12. The apparatus as claimed in claim 9 wherein one of said charcoal elements includes fine charcoal for absorbing hydrocarbon gas vapors to be mixed with air.

13. The apparatus as claimed in claim 1 and further including an oil separator filter connected to said second gas inlet.

14. The apparatus as claimed in claim 13 wherein the separator filter includes an oil filter.

15. The apparatus as claimed in claim 13 or 14 wherein the separator filter includes means for trapping oil and carbon particles, and means for conducting oil from the oil separator filter back into the engine crankcase.

16. The apparatus as claimed in claim 15 wherein the trapping means comprise a plurality of filter members forming a tortuous path for said vapors.

17. The apparatus as claimed in any one of claims 1 to 6 wherein vented hydrocarbon gas vapors when mixed into the liquid mixture by means of an impeller in a mixing chamber vents out high octane gas vapors for a liquid mixture.

18. The apparatus as claimed in any one of claims 1 to 6 wherein the hydrocarbon gas vapors recovered from the fuel tank vent from only the engine crankcase vent or only gas vapors from the fuel tank vent are recovered by the apparatus to provide negatively charged pre-oxidized hydrocarbon gas vapors.

19. The apparatus as claimed in any one of claims 1 to 6 wherein negatively charged oxygen gas vapors are introduced to the combustion system of the engine to increase piston compression and expansion of said engine.

20. The apparatus as claimed in any one of claims 1 to 6 wherein two ionizer circuits are connected in parallel, each having an output power of 1000 to 30,000 negative volts.

21. The apparatus as claimed in any one of claims 1 to 6 wherein negatively charged pre-oxidized hydrocarbon gas vapors are added into the combustion chambers of said engine for improving the fuel consumption, thermal efficiency and reduction of carbon deposits of said engine.

22. The apparatus as claimed in any one of claims 1 to 6 wherein said hydrocarbon gas vapors are recovered to form ethane and methane hydrocarbon gases for mixing with negatively charged oxygen gas vapors for further combustion.

23. The apparatus as claimed in any one of claims 1 to 6 wherein said negatively charged pre-oxidized hydrocarbon gas vapors are combined with air flowing through the air induction system of said engine to increase the oxygen ratio of said engine.

24. The apparatus as claimed in any one of claims 1 to 6 wherein said negatively charged pre-oxidized hydrocarbon gas vapors are combined with ambient air to improve the air to fuel ratio for said engine.

25. The apparatus as claimed in any one of claims 1 to 6 wherein hydrocarbon gas vapors from said fuel tank and crankcase are fed via said apparatus to the air induction system of said engine.

26. A method to improve the ratio of mass of air to mass of fuel comprising the steps of taking vented hydrocarbon gas vapors from a fuel tank and taking vented hydrocarbon gas vapors from an engine crankcase, taking ambient air from the atmosphere, mixing the vented hydrocarbon gas vapors and ambient air with a liquid mixture of water and alcohol, causing dissociation of molecular chains of the hydrocarbon gas vapors, expelling the dissociated molecular chains of the hydrocarbon gas vapors from the liquid mixture, passing said dissociated molecular chains of hydrocarbon gas vapors through one or more ionizers to form negatively charged pre-oxidized hydrocarbon gas vapors, and introducing the negatively charged pre-oxidized hydrocarbon gas vapors into the air induction system of the engine.

27. The method according to claim 26 wherein the vented hydrocarbon gas vapors are mixed into the liquid mixture by means of an impeller in a mixing chamber which vents out high octane gas vapors from the liquid mixture.

28. The method according to claim 26 wherein the hydrocarbon gas vapors are recovered from the fuel tank and/or the engine crankcase to provide the negatively charged gas vapors.

29. The method according to claim 26 wherein negatively charged gas vapors are introduced to the combustion chambers of the engine to increase piston compression and expansion of the engine.

30. The method according to claim 26 wherein the negatively charged gas vapors are added into the combustion chambers of the engine for improving fuel consumption, thermal efficiency and reduction of carbon deposits of the engine.

31. The method according to claim 26 wherein the vented hydrocarbon gas vapors are recovered to form ethane and methane hydrocarbon gases for mixing with negatively charged oxygen gas vapors for further combustion.

32. The method according to claim 26, wherein the negatively charged gas vapors are combined with the air flowing through the air induction system of the engine to increase the oxygen ratio of the engine.

33. The method according to claim 26 wherein the negatively charged gas vapors are mixed with ambient air to improve air to fuel ratio for the engine.

* * * * *